United States Patent
Jeong

(10) Patent No.: US 10,166,857 B2
(45) Date of Patent: Jan. 1, 2019

(54) TWO-WAY MOTION TYPE ACTIVE AIR FLAP SYSTEM AND VEHICLE HAVING THE SAME

(71) Applicant: HYUNDAI MOTOR COMPANY, Seoul (KR)

(72) Inventor: Ji-Min Jeong, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/377,270

(22) Filed: Dec. 13, 2016

(65) Prior Publication Data
US 2018/0099558 A1    Apr. 12, 2018

(30) Foreign Application Priority Data

Oct. 6, 2016 (KR) .................. 10-2016-0128927

(51) Int. Cl.
*B60K 11/08* (2006.01)
*B60K 11/04* (2006.01)

(52) U.S. Cl.
CPC ............ *B60K 11/085* (2013.01); *B60K 11/04* (2013.01)

(58) Field of Classification Search
CPC ....... B60K 11/085; B60K 11/08; B60K 11/06; B60K 11/04
USPC ..................... 180/68.1, 68.2, 68.4
See application file for complete search history.

(56) References Cited

U.S. PATENT DOCUMENTS

| 8,302,714 | B2 | 11/2012 | Charnesky et al. |
| 8,627,911 | B2 | 1/2014 | Tregnago et al. |
| 8,720,624 | B2 * | 5/2014 | Remy ................. B60K 11/085 180/68.1 |
| 9,365,106 | B2 | 6/2016 | Bruckner |
| 9,610,835 | B2 * | 4/2017 | Nam ...................... F16H 19/02 |
| 2015/0072604 | A1 * | 3/2015 | Yoo ...................... B60K 11/085 454/152 |
| 2015/0165896 | A1 * | 6/2015 | Nam ..................... B60K 11/04 701/49 |

FOREIGN PATENT DOCUMENTS

| JP | 09-242444 A | 9/1997 |
| KR | 20120062056 A | 6/2012 |
| KR | 101490957 B1 | 2/2015 |
| KR | 20150029806 A | 3/2015 |

* cited by examiner

*Primary Examiner* — John D Walters
(74) *Attorney, Agent, or Firm* — McDonnell Boehnen Hulbert & Berghoff LLP

(57) ABSTRACT

Disclosed herein is a two-way motion type active air flap system of a vehicle, which includes first, second, and third air flaps configured by a combination of a row array of air flaps and a column array of air flaps. The column array of air flaps is opened forward in a revolving manner by the rotational force of a flap rotary actuator, and the row array of air flaps is opened laterally in a sliding by the rotational force of a flap sliding actuator, so that the first, second, and third air flaps control a blast space through which external air passes. Thus, since the front opening and the lateral opening of the air flaps are performed independently, it is possible to fundamentally prevent an adverse effect of causing overcooling and deteriorating aerodynamic performance.

13 Claims, 6 Drawing Sheets

FIRST STEP IN AAF ON (LH SIDE)

SECTION A-A'

SECOND STEP IN AAF ON (LH SIDE)

SECTION B-B'

THROUGH STEP IN AAF ON (LH SIDE)

FLAP MOVEMENT DIRECTION

SECTION C-C'

TWO-WAY MOTION TYPE ACTIVE AIR FLAP SYSTEM AND VEHICLE HAVING THE SAME

CROSS-REFERENCE(S) TO RELATED APPLICATIONS

This application claims benefit of and priority to Korean Patent Application No. 10-2016-0128927, filed on Oct. 6, 2016, which is incorporated herein by reference in its entirety.

BACKGROUND

Technical Field

Example embodiments of the present disclosure relate to an active air flap system; and, particularly, to a two-way motion type active air flap system capable of subdividing the opening of a flap into front opening in a revolving manner and lateral opening in a sliding manner, and a vehicle having the same.

Description of Related Art

In recent years, an improvement in vehicle air conditioning systems has been demanded in conjunction with the need for continuous improvement in vehicle fuel efficiency, and thus an active air flap (hereinafter, referred at as "AAF") is increasingly used in vehicle air conditioning systems.

The AAF includes a plurality of air flaps adapted to match the size of a grill space in front of an engine room, and the air flaps are connected to a flap rotary actuator and links to operate in a revolving manner by the rotational force of the flap rotary actuator and the movement of the links. The air flaps are typically controlled to be in an AAF open (100% opening) or AAF close (0% opening) state in the revolving manner by the rotational force of the flap rotary actuator and the movement of the links. In this way, the air flaps are opened forward in order to open the grill space in front of the engine room.

By way of example, the AAF changes the front opening area of each of the air flaps from the AAF open state to the AAF close state based on the speed of a vehicle in order to improve the aerodynamic performance of the vehicle by blocking the introduction of traveling external air into the engine room. This basic function is performed in an aerodynamic improvement mode. In another example, the AAF changes the front opening area of the air flap from the AAF close state to the AAF open state based on the cooling load of an air conditioner or the heating load of a heat pump in order to improve the heat exchange performance of a cooling fan, a condenser, and a radiator by increasing the introduction of traveling external air into the engine room. This extension function is performed in a heat exchange mode.

Therefore, the AAF adjusts the front opening area of the air flap to improve aerodynamic force and cooling/heating performance, thereby contributing to an improvement in fuel efficiency. Furthermore, the AAF contributes to a reduction in time needed for cooling an engine and to a vehicle performance improvement such as the rapid warm-up of the engine for the improvement of processing of exhaust gas by a catalytic converter.

However, because the AAF merely adjusts the front opening area of the air flap between the AAF open state and the AAF close state, the AAF may have the adverse effect of causing overcooling and deteriorating aerodynamic performance in the AAF open state.

This adverse effect largely results from the AAF having only two states (e.g. ON/OFF type AAF), but it may be relieved to a certain degree by controlling an actuator in a Pulse Width Modulation ("PWM") duty manner. However, because the front opening area of the air flap is adjustable even in the PWM duty manner, it is impossible to perfectly prevent the adverse effects described above.

SUMMARY OF THE INVENTION

An embodiment of the present disclosure is directed to a two-way motion type active air flap system in which an air flap consists of a combination of a row array of air flaps and a column array of air flaps, the column array of air flaps operated so as to be opened forward in a revolving manner, and the row array of air flaps operated so as to be opened laterally in a sliding manner, so that an opening space is adjusted by a combination of the front opening area and the lateral opening area of the air flap. Particularly, the row array of air flaps is opened laterally in a multistep manner, independently of the front opening of the column array of air flaps, thereby fundamentally preventing the adverse effect of causing overcooling and deteriorating aerodynamic performance.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a two-way motion type active air flap system may include a plurality of air flaps configured to be opened forward with a flap rotary actuator, and configured to be opened laterally with a flap sliding actuator, wherein the front opening and the lateral opening of the plurality of air flaps are controlled independently. The plurality of air flaps may consist of a combination of a row array of air flaps and a column array of air flaps, wherein the column array of air flaps are configured to be opened forward with the flap rotary actuator, and wherein the row array of air flaps are configured to be opened laterally with the flap sliding actuator.

The plurality of air flaps may be opened laterally by rectilinearly sliding by the flap sliding actuator.

The two-way motion type active air flap system may also include a flap case coupled to the plurality of air flaps, and a sliding frame coupled to the flap sliding actuator, wherein the plurality of air flaps include a fixed flap fixed to the flap case, a linkage flap configured to slide with respect to the fixed flap to be stacked thereon, and a movable flap configured to slide with respect to the linkage flap to be stacked thereon and further configured to push the linkage flap such that the linkage flap is stacked on the fixed flap.

The linkage flap may be stacked on a back surface of the fixed flap, and the movable flap is stacked on a back surface of the linkage flap.

Front and rear stopper ends may respectively protrude from the ends of each of the fixed flap, the linkage flap, and the movable flap in order to limit rectilinear movement of the plurality of air flaps.

The plurality of air flaps may consist of first, second, and third air flaps; the first, second, and third air flaps form a column array; and the fixed flap, the linkage flap, and the movable flap provided in each of the first, second, and third air flaps form a row array.

The sliding frame may be fixed to the movable flap of the plurality of air flaps, and may be coupled to the flap sliding actuator for rectilinearly moving the movable flap such that the plurality of air flaps are opened laterally.

The sliding frame may be coupled to the flap sliding actuator by a rotating pinion and a rack rectilinearly moving by engaging with the pinion. The rack may be provided in the sliding frame, and the pinion is rotated by the flap sliding actuator.

The plurality of air flaps may be coupled to the flap rotary actuator, and may be opened forward by a rotational force of the flap rotary actuator.

The plurality of air flaps may be operated in response to a control signal of a controller, the plurality of air flaps may be opened forward in response to a control signal changed from an active air flap (AAF) ON signal to an AAF OFF signal, and the plurality of air flaps may be opened laterally in response to a lateral opening control signal output from the controller. The lateral opening control signal may be divided in a multistep manner.

In accordance with another embodiment of the present disclosure, a vehicle includes an active air flap system comprising first, second, and third air flaps configured as a combination of a column array of air flaps and a row array of air flaps that open forward and laterally; a flap case coupled with the first, second, and third air flaps so as to match a size of a grill space in front of an engine room while defining a blast space; a sliding frame serving to laterally open the first, second, and third air flaps; a flap sliding actuator connected to the sliding frame by a pinion and a rack; a flap rotary actuator allowing the first, second, and third air flaps to be opened forward; and an engine control unit ("ECU") to control operation of the active air flap system.

The active air flap system may be mounted in the grill space in front of the engine room. The active air flap system may be located in front of a cooling system provided in the engine room. The cooling system may comprise a radiator and a condenser for performing heat exchange with outside air.

The ECU may be connected to an active air flap (AAF) control map, and the AAF control map may control the blast space through which external air passes such that the first, second, and third air flaps are opened forward in a revolving manner and are opened laterally in a sliding manner.

DESCRIPTION OF SPECIFIC EMBODIMENTS

Figure 1:
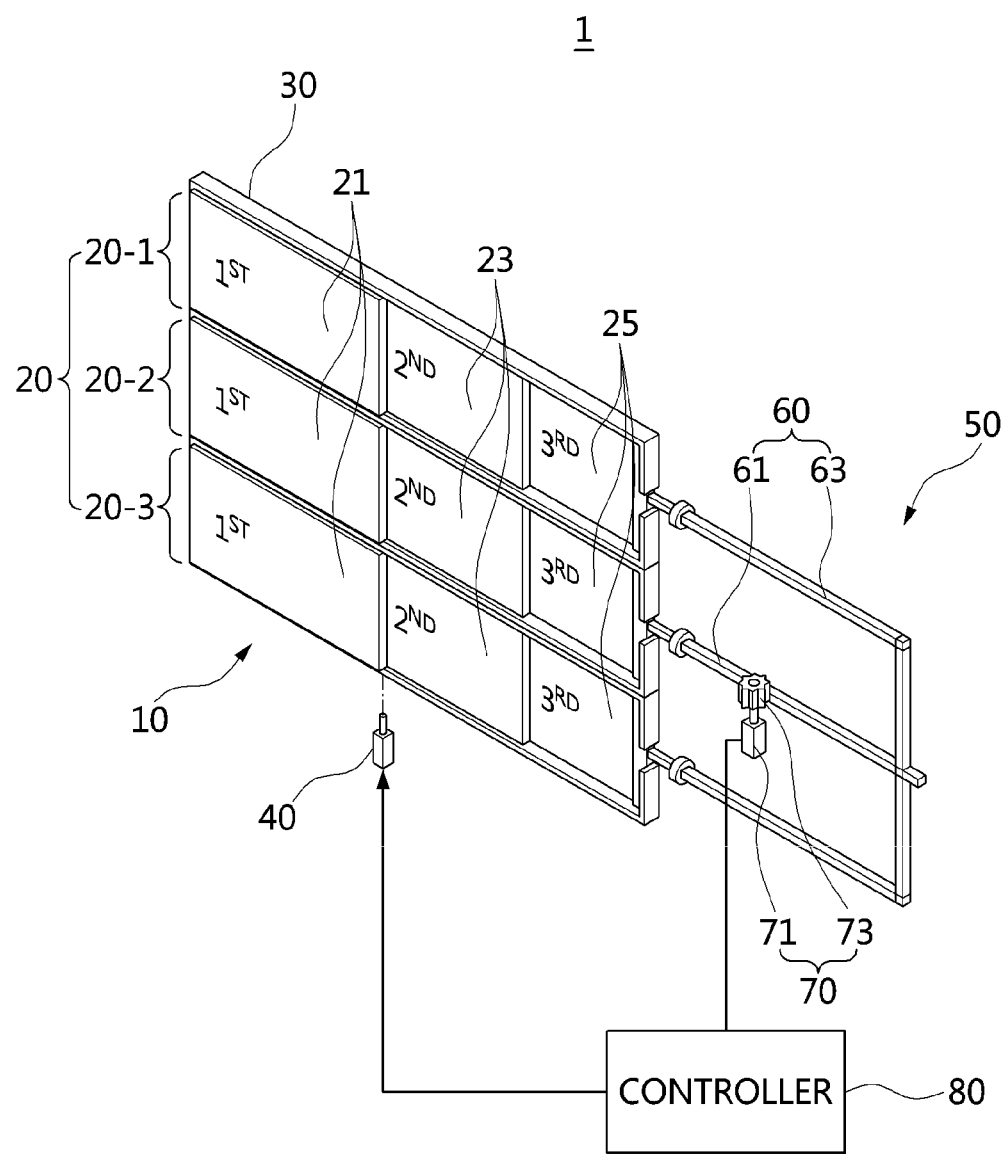
FIG. 1 illustrates a two-way motion type active air flap system, according to an example embodiment.

Example embodiments of the present disclosure are described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Referring to FIG. 1, an Active Air Flap (AAF) system 1 includes an AAF 10 consisting of a flap unit 20, a flap case 30, and a flap rotary actuator 40, a flap slider 50 consisting of a sliding frame 60 and a flap sliding actuator 70, and a controller 80.

Specifically, the flap unit 20 is operated so as to be opened forward by the flap rotary actuator 40 and to be opened laterally by the flap sliding actuator 70. The flap unit 20 is opened forward by rotating in a revolving manner using the rotational force of the flap rotary actuator 40. The flap unit 20 is opened laterally by rectilinearly moving in a sliding manner using the rotational force of the flap sliding actuator 70. The front opening of the flap unit 20 is controlled from a 0% opening state (close state) to a 100% opening state (open state) in an ON/OFF type AAF open/close control. The lateral opening of the flap unit 20 is gradually performed through first, second, and third steps in a step type AAF open/close control. By way of example, the flap unit 20 includes three first, second, and third air flaps 20-1, 20-2, and 20-3, each consisting of a fixed flap 21, a linkage flap 23, and a movable flap 25. The first, second, and third air flaps 20-1, 20-2, and 20-3 configured by the combination of a row array of air flaps and a column array of air flaps, thereby perform the front opening and the lateral opening.

Specifically, the flap case 30 is mounted to match the size of a grill space in front of an engine room of a vehicle, using a front component having a front-end module. The flap case 30 is provided as a space for coupling of the first, second, and third air flaps 20-1, 20-2, and 20-3 together with the flap rotary actuator 40. For example, the flap case 30 is a rectangular frame defining a rectangular space, and a first, second, and third air flap link 30-1, 30-2, and 30-3 (see FIG. 4), which couple the first, second, and third air flaps 20-1, 20-2, and 20-3 to the flap rotary actuator 40, is coupled to the rectangular frame.

Specifically, the flap rotary actuator 40 is coupled to the first, second, and third air flap link 30-1, 30-2, and 30-3 and may be located at the center of the rectangular space. The flap rotary actuator 40 generates rotational force for moving the first, second, and third air flap link 30-1, 30-2, and 30-3 such that the first, second, and third air flaps 20-1, 20-2, and 20-3 are opened forward. The flap rotary actuator 40 includes a reversible motor and a gear member (e.g., a reduction gear), and connects a rotary shaft which is rotatable at both side of the motor to the first, second, and third air flap link 30-1, 30-2, and 30-3. Here, the rotary shaft may be the first, second, and third air flap link 30-1, 30-2, and 30-3. Therefore, the components (not shown) of the flap rotary actuator 40 are identical to existing components which allow the first, second, and third air flaps 20-1, 20-2, and 20-3 to be opened forward in the revolving manner when the AAF 10 is turned on.

The sliding frame 60 consists of a rectilinear rack bar 61 and a "C"-shaped frame 63 connected to one end of the rack bar 61, thereby forming an "E" shape as a whole. The sliding frame 60 forms three top, middle, and bottom bar ends. The top bar end is connected to the first air flap 20-1, the middle bar end is connected to the second air flap 20-2, and the bottom bar end is connected to the third air flap 20-3. Particularly, the rack bar 61 is formed with a rack 61a which engages with a pinion 73 of the flap sliding actuator 70, and the sliding frame 60 may thus be moved forward and rearward by the forward and reverse rotation of the pinion 73.

The flap sliding actuator 70 includes a reversible motor 71 and a pinion 73 which is fixed to the motor shaft of the motor 71 and is rotated by the motor 71. The pinion 73 moves the rack bar 61 in the forward and rearward directions by engaging with the rack 61a formed on the rack bar 61 of the sliding frame 60, and the sliding frame 60 is moved forward and rearward by the forward and rearward movement of the rack bar 61, thereby enabling the first, second, and third air flaps 20-1, 20-2, and 20-3 to be opened laterally through the first, second, and third steps. The flap sliding actuator 70 laterally opens the first, second, and third air flaps 20-1, 20-2, and 20-3 through the first, second, and third steps in the sliding manner when the AAF 10 is turned on.

The controller 80 outputs control signals to individually drive the motor of the flap rotary actuator 40 and the motor 71 of the flap sliding actuator 70. The control signals may be signals generated by an operation switch, or signals output from a vehicle controller included in a vehicle.

Figure 2:
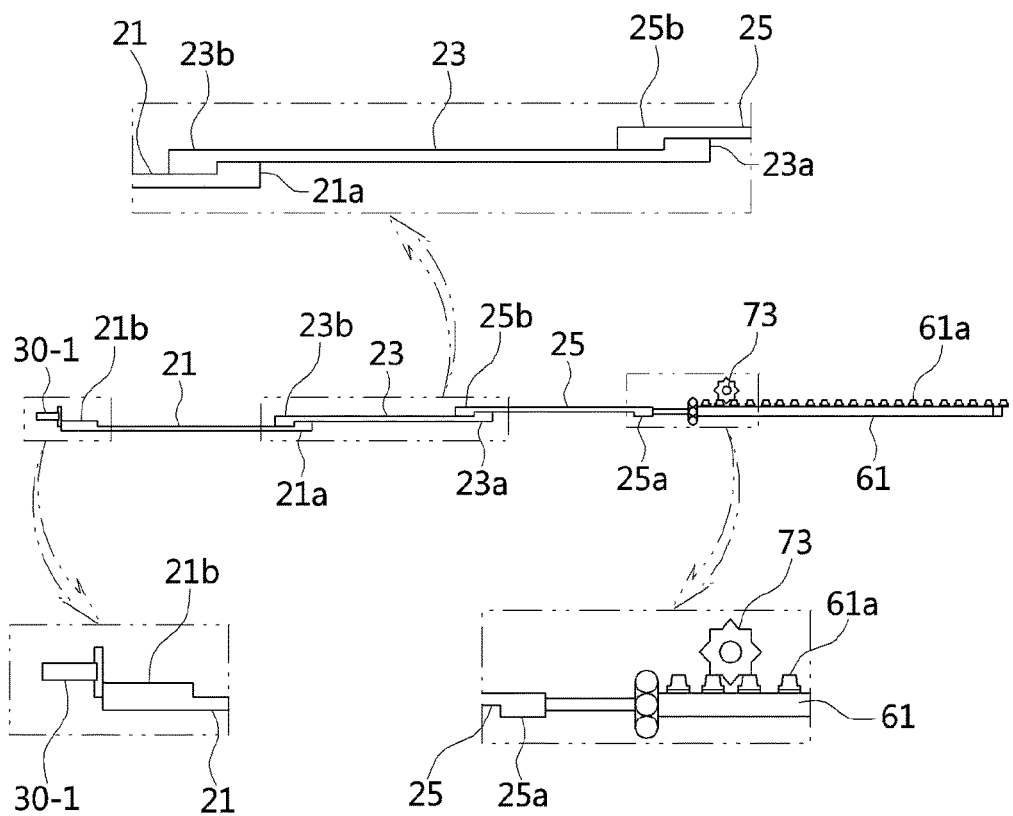
FIG. 2 illustrates a top view of an active air flap and a flap slider, according to an example embodiment.

Referring to FIG. 2, the first air flap 20-1 consists of the fixed flap 21 which is fixed to the first air flap link 30-1 of the flap case 30, the movable flap 25 which is fixed to the top bar end of the sliding frame 60, and the linkage flap 23 which is located between the fixed flap 21 and the movable flap 25. In addition, each of the second and third air flaps 20-2 and 20-3 consists of a fixed flap 21, a linkage flap 23, and a movable flap 25, similar to the first air flap 20-1. Therefore, all of first, second, and third air flaps 20-1, 20-2, and 20-3 consist of the same components. The overall size of the fixed flap 21, the linkage flap 23, and the movable flap 25 is adapted to match the space size of the flap case 30, but the lateral opening area by each of the movable flap 25 and the linkage flap 23 and the lateral closed area by the fixed flap 21 may vary according to the volume of air.

Among the fixed, linkage, and movable flaps 21, 23, and 25, the fixed flap 21 is fixed to the air flap link 30-1 so as not to move, the link flap 23 is rectilinearly moved by the movable flap 25 to be stacked on the fixed flap 21, and the movable flap 25 is rectilinearly moved by the sliding frame 60 to be stacked on the linkage flap 23. To this end, the fixed, linkage, and movable flaps 21, 23, and 25 are respectively formed with front stopper ends 21a, 23a, and 25a and rear stopper ends 21b, 23b, and 25b in order to limit the rectilinear movement strokes of the flaps. For example, the front and rear stopper ends 21a and 21b of the fixed flap 21 protrude from one surface of the fixed flap 21 in the same direction, and the front and rear stopper ends 25a and 25b of the movable flap 25 protrude from one surface of the movable flap 25 in the same direction. In contrast, the front and rear stopper ends 23a and 23b of the linkage flap 23 protrude from both surfaces of the linkage flap 23 in opposite directions.

Therefore, when the first, second, and third air flaps 20-1, 20-2, and 20-3 are assembled to each other, the flap unit 20 is configured such that the first, second, and third air flaps 20-1, 20-2, and 20-3, which are horizontally arranged, form a column array, and three pairs of fixed flaps 21, linkage flaps 23, and movable flaps 25, which are vertically arranged, form a row array, respectively.

When the motor of the flap rotary actuator 40 is driven by the control of the controller 80, the motor rotates the fixed, linkage, and movable flaps 21, 23, and 25 in the revolving manner so that all of first, second, and third air flaps 20-1, 20-2, and 20-3 are opened forward. In addition, when the motor 71 of the flap sliding actuator 70 is driven by the control of the controller 80, the fixed, linkage, and movable flaps 21, 23, and 25 rectilinearly slide in the sliding manner by the sliding frame 60. The movable flap 25 is stacked on the linkage flap 23, and then the linkage and movable flaps 23 and 25 are stacked on the fixed flap 21, so that the first, second, and third air flaps 20-1, 20-2, and 20-3 are opened laterally through three steps.

Meanwhile, FIGS. 3 to 9 illustrate the state in which an AAF system 1 is applied to a vehicle 100 and is operated such that an air flap is opened laterally in a sliding manner.

Figure 3:
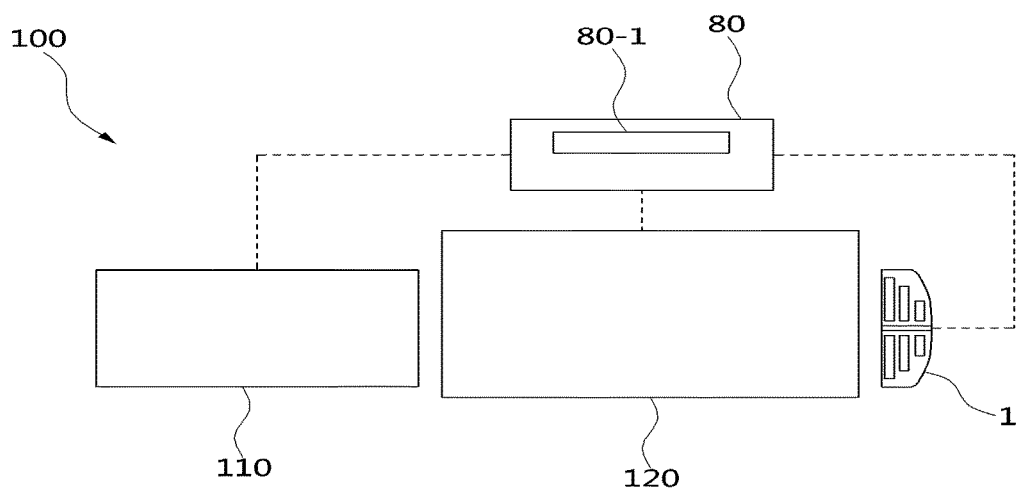
FIG. 3 is a block diagram illustrating the configuration of a vehicle to which the two-way motion type active air flap system is applied, according to an example embodiment.

Referring to FIG. 3, the vehicle 100 includes an engine 110 and a cooling system 120. The AAF system 1 is mounted to match the size of a grill space in front of an engine room using a front component having a front-end module, and is provided in front of the cooling system 120. The vehicle 100 includes a controller 80 for controlling the engine 110, the cooling system 120, and the AAF system 1, and an AAF control map 80-1.

The engine 110 is an internal combustion engine, the cooling system 120 includes a radiator, a condenser, and the like which perform heat exchange with outside air, and the AAF system 1 is the AAF system 1 described in FIGS. 1 and 2.

However, the controller 80 of the vehicle 100 differs from the above-mentioned controller 80 in that the controller 80 of the vehicle 100 controls the operation of the AAF system 1 such that first, second, and third air flaps 20-1, 20-2, and 20-3 are opened forward and laterally based on the AAF control map 80-1, and simultaneously controls the engine 110 and the cooling system 120. Therefore, the controller 80 of the vehicle 100 is not a dedicated controller which controls the AAF system 1, but is an ECU (Electronic Control Unit) which controls a variety of electronic devices including the engine, based on vehicle detection information.

Figure 4:
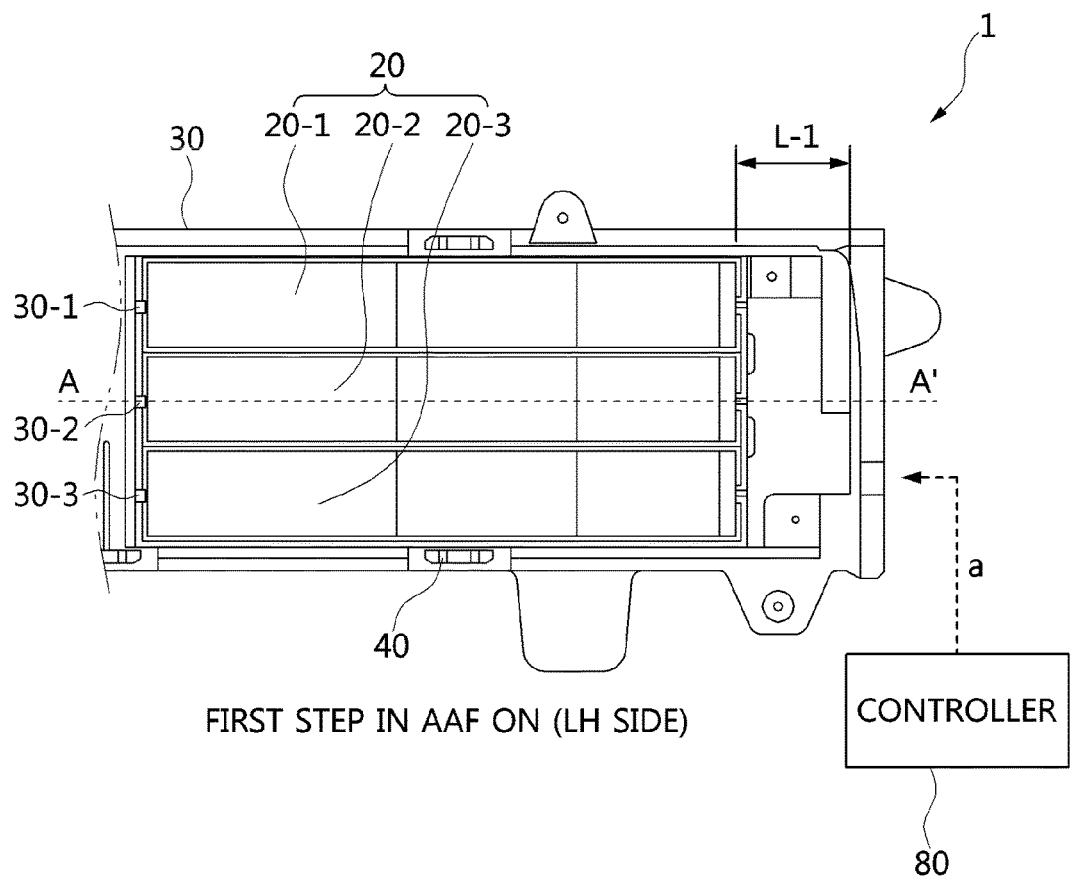
FIG. 4 illustrates a first step operation state of the two-way motion type active air flap system, according to an example embodiment.
Figure 5:
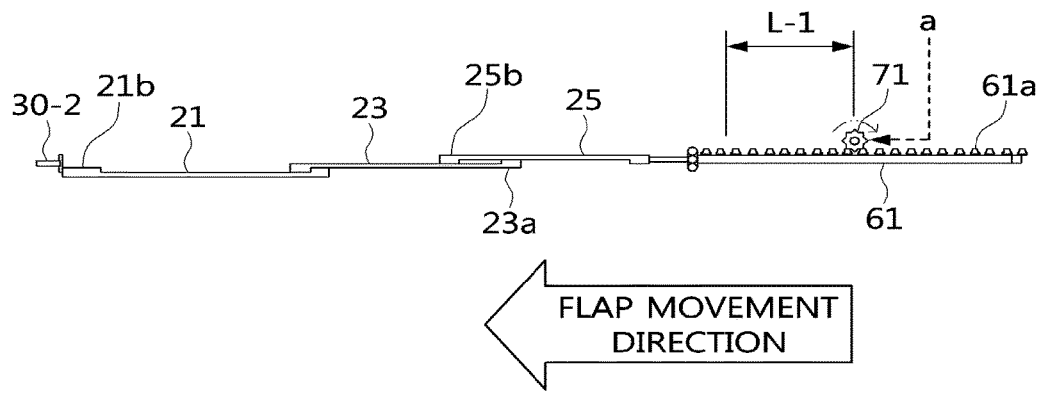
FIG. 5 is a cross-sectional view illustrating the movement of the active air flap and the flap slider in the first step operation state of FIG. 4.

FIGS. 4 and 5 illustrate the state in which the first, second, and third air flaps 20-1, 20-2, and 20-3 are opened laterally through a first step by the controller 80. In this case, it is assumed that the motor 71 is rotated forward (clockwise) and the movement by the forward (clockwise) rotation is forward movement. The output of the control signals of the controller 80 is stopped after the air flaps are opened laterally through the first step. Such control signal output is similar even when the air flaps are opened laterally through the second and third steps.

Referring to FIG. 4, when the motor 71 of the flap sliding actuator 70 is driven and rotates the pinion 71 in response to a first lateral opening signal (a) output from the controller 80, the rack bar 61 is rectilinearly moved forward through the rank 61a engaging with the pinion 71 and the sliding frame 60 is moved forward by the forward movement of the rack bar 61. As a result, each of the movable flaps 25 of the first, second, and third air flaps 20-1, 20-2, and 20-3, which are respectively fixed to the top, middle, and bottom bar ends of the sliding frame 60, slides to the linkage flap 23 by a first distance L-1 and is stacked thereon. Therefore, the first, second, and third air flaps 20-1, 20-2, and 20-3 are in a first step lateral opening state in which the movable flap 25 is partially opened.

Referring to FIG. 5, the rear stopped end 25b of the movable flap 25 slides from the upper surface of the linkage flap 23 by the first distance L-1 in the first step lateral opening state, in which case the front stopper end 25a of the movable flap 25 does not come into contact with the front stopper end 23a of the linkage flap 23. Therefore, in the first step lateral opening state, only the movable flap 25 is moved and the linkage flap 23 is not moved.

Figure 6:
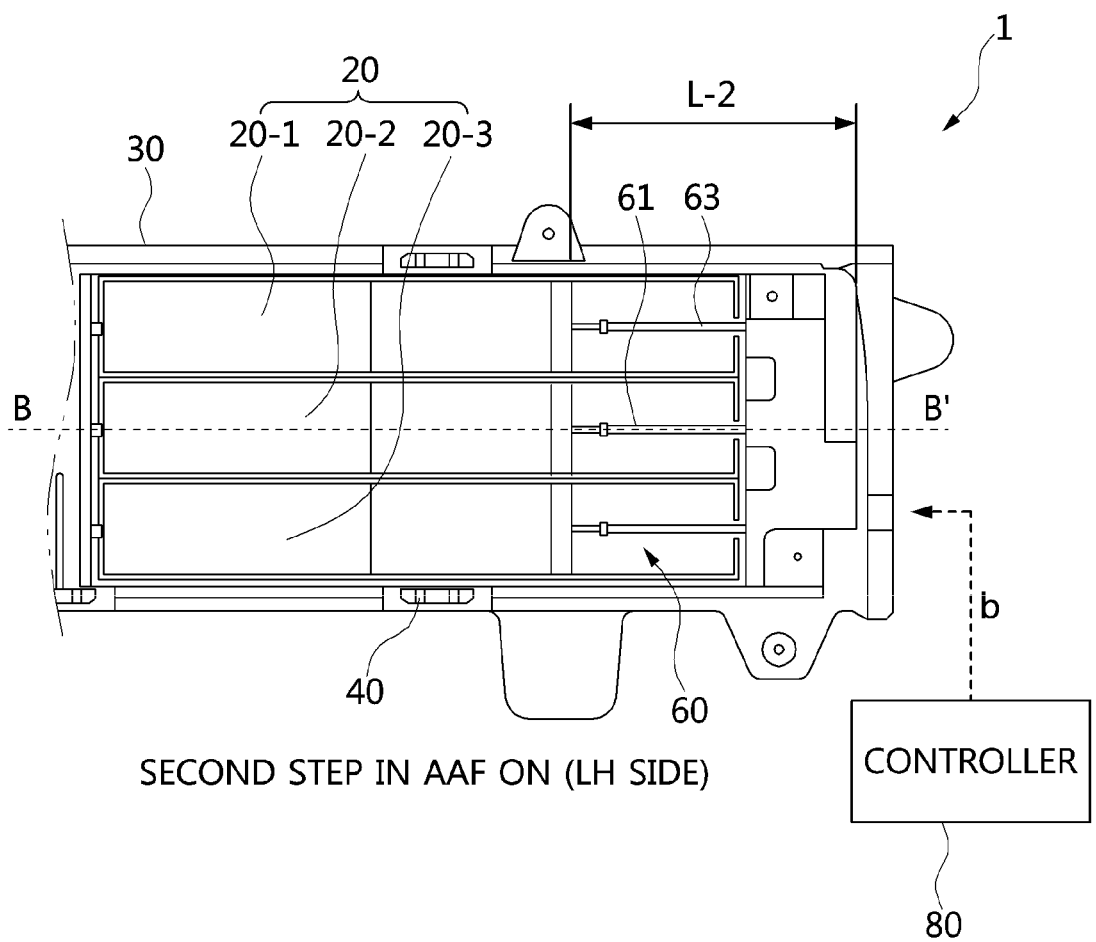
FIG. 6 illustrates a second step operation state of the two-way motion type active air flap system, according to an example embodiment.
Figure 7:
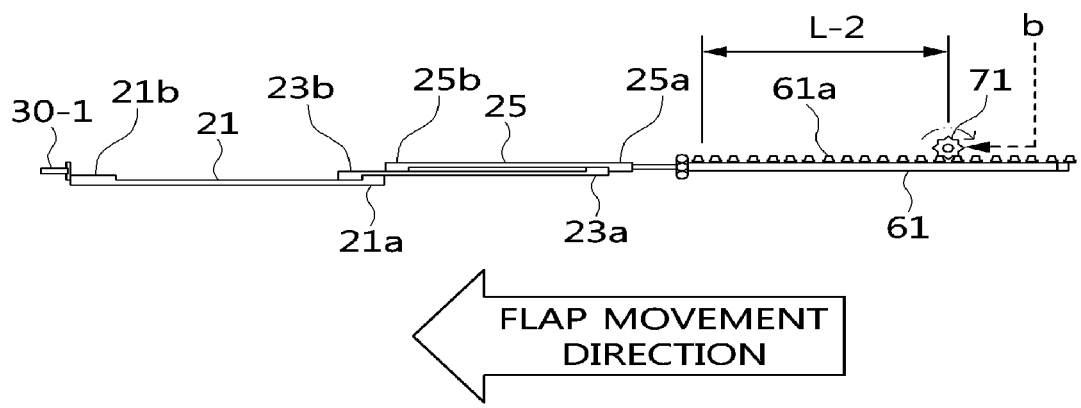
FIG. 7 is a cross-sectional view illustrating the movement of the active air flap and the flap slider in the second step operation state of FIG. 6.

FIGS. 6 and 7 illustrate the state in which the first, second, and third air flaps 20-1, 20-2, and 20-3 are opened laterally through a second step by the controller 80.

Referring to FIG. 6, the motor 71 of the flap sliding actuator 70 is driven in response to a second lateral opening signal (b) output from the controller 80. Accordingly, the rack bar 61 engaging with the pinion 71 and the rack 61a is rectilinearly moved by the rotation of the pinion 71 and is further moved forward from the first distance L-1, and the sliding frame 60 is further moved forward from the first distance L-1 by the rack bar 61. As a result, each of the movable flaps 25 of the first, second, and third air flaps 20-1, 20-2, and 20-3, which are respectively fixed to the top, middle, and bottom bar ends of the sliding frame 60, slides to the linkage flap 23 by a second distance L-2 and is stacked thereon. Therefore, the first, second, and third air flaps 20-1, 20-2, and 20-3 are in a second step lateral opening state in which the movable flap 25 is fully opened.

Referring to FIG. 7, the rear stopped end 25b of the movable flap 25 slides from the upper surface of the linkage flap 23 by the second distance L-2 in the second step lateral opening state, in which case the front stopper end 25a of the movable flap 25 comes into contact with the front stopper end 23a of the linkage flap 23. Therefore, in the second step lateral opening state, only the movable flap 25 is moved and the linkage flap 23 is not moved.

Figure 8:
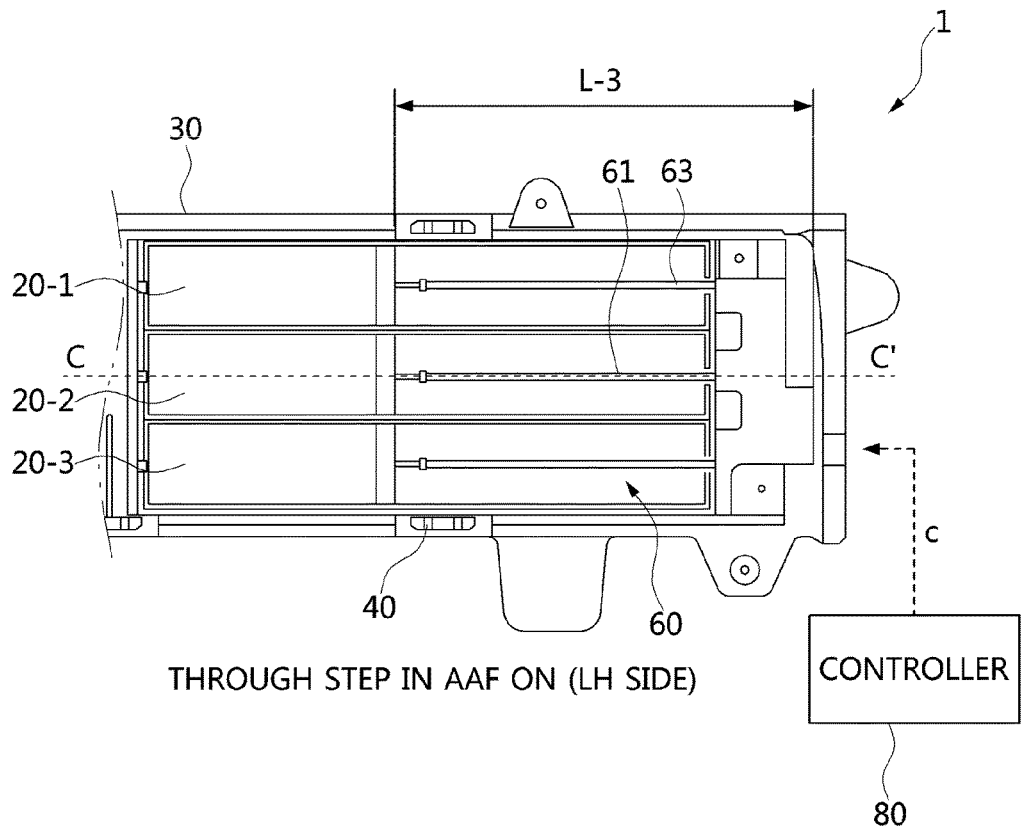
FIG. 8 illustrates a third step operation state of the two-way motion type active air flap system, according to an example embodiment.
Figure 9:
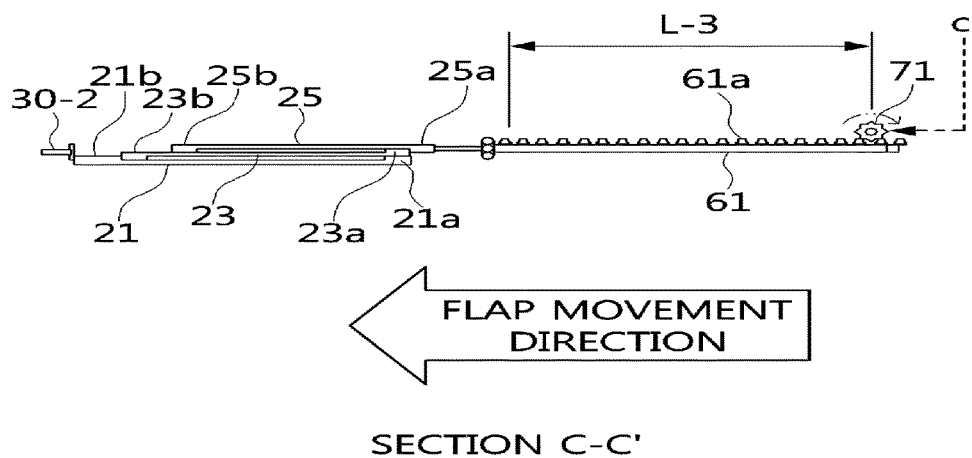
FIG. 9 is a cross-sectional view illustrating the movement of the active air flap and the flap slider in the third step operation state of FIG. 8.

FIGS. 8 and 9 illustrate the state in which the first, second, and third air flaps 20-1, 20-2, and 20-3 are opened laterally through a third step by the controller 80.

Referring to FIG. 8, the motor 71 of the flap sliding actuator 70 is driven in response to a third lateral opening signal (c) output from the controller 80. Accordingly, the rack bar 61 engaging with the pinion 71 and the rack 61a is rectilinearly moved by the rotation of the pinion 71 and is further moved forward from the second distance L-2, and the sliding frame 60 is further moved forward from the second distance L-2 by the rack bar 61. As a result, the linkage flap 23 slides to the fixed flap 21 and is stacked thereon by each of the movable flaps 25 of the first, second, and third air flaps 20-1, 20-2, and 20-3, which are respectively fixed to the top, middle, and bottom bar ends of the sliding frame 60, and the movable flap 25 and the linkage flap 23 are moved together by a third distance L-3. Therefore, the first, second, and third air flaps 20-1, 20-2, and 20-3 are in a third step lateral opening state in which the movable flap 25 and the linkage flap 23 are fully opened.

Referring to FIG. 9, the front stopped end 25a of the movable flap 25 pushes the front stopper end 23a of the linkage flap 23, and the linkage flap 23 slides from the upper surface of the fixed flap 2 by the third distance L-3 in the third step lateral opening state, in which case the rear stopper end 23b of the linkage flap 23 comes into contact with the rear stopper end 21b of the fixed flap 21. Therefore, in the third step lateral opening state, the movable flap 25 and the linkage flap 23 are moved together and the fixed flap 21 is not moved.

Figure 10:
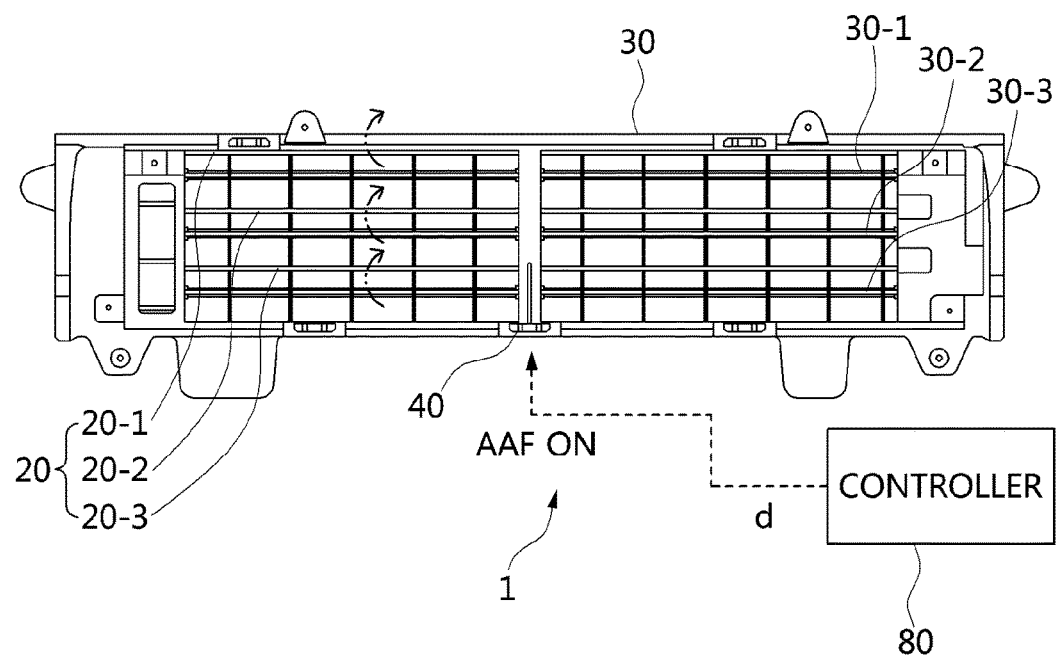
FIG. 10 illustrates the state in which the active air flap is changed from an AAF open state to an AAF close state when an AAF is turned on, according to an example embodiment.

Meanwhile, FIG. 10 illustrates the state in which the AAF system 1 is operated so as to be closed forward in the revolving manner in order to improve the aerodynamic performance of the traveling vehicle 100.

As illustrated in FIG. 10, all of first, second, and third air flaps 20-1, 20-2, and 20-3 are closed in response to an AAF ON signal of the controller 80, and thus the AAF system 1 is changed from an AAF open (100% opening) state to an AAF close (0% opening) state. The front closing operation is performed in such a manner that the motor of the flap rotary actuator 40 rotates the gear member (reduction gear) in response to an AAF ON signal (d) output to the flap rotary actuator 40 from the controller 80, and the gear member rotates about the first, second, and third air flap link 30-1, 30-2, and 30-3 of the flap case 30, which are each a rotary shaft. In addition, the front opening operation is performed by the same principle. Therefore, since the first, second, and third air flaps 20-1, 20-2, and 20-3 are operated in response to AAF ON/OFF signals between an AAF open (100% opening) (front opening) state and an AAF close (0% opening) (front closing), similar to the method applied to the typical AAF system, a detailed description thereof will be omitted.

As described above, the two-way motion type active air flap system according to the embodiment of the present disclosure includes the first, second, and third air flaps 20-1, 20-2, and 20-3 configured by the combination of the row array of air flaps and the column array of air flaps, the column array of air flaps is opened forward in the revolving manner by the rotational force of the flap rotary actuator 40, and the row array of air flaps is opened laterally in the sliding manner by the rotational force of the flap sliding actuator 70, so that the first, second, and third air flaps 20-1, 20-2, and 20-3 control a blast space through which external air passes. Thus, since the front opening and the lateral opening are performed independently, it is possible to fundamentally prevent an adverse effect of causing overcooling and deteriorating aerodynamic performance.

The active air flap system of the present disclosure has the following advantages and effects by opening and closing a grill space in front of an engine room using an air flap consisting of a combination of a row array of air flaps and a column array of air flaps.

Firstly, it is possible to embody a new active air flap by the combination of a row array of air flaps and a column array of air flaps. Secondly, because the row array of air flaps and the column array of air flaps are independently controlled, it is possible to prevent an adverse effect of causing overcooling and deteriorating aerodynamic performance owing to the lateral opening area of the row array of air flaps. Thirdly, because the row array of air flaps is opened laterally in a multistep manner, they assist in preventing an adverse effect of causing overcooling and deteriorating aerodynamic performance. Fourthly, because the column array of air flaps is controlled so as to be opened forward in a revolving manner and the row array of air flaps is controlled so as to be opened laterally in a sliding manner, the grill space in front of the engine room can be adjusted by the combination of the front opening area of the column array of air flaps and the lateral opening area of the row array of air flaps. Fifth, it is possible to resolve a concern about the lack of a cooling rate by opening the column array of air flaps in the forward direction when the cooling rate is insufficient in the state in which the row array of air flaps is opened laterally.

While the present disclosure has been described with respect to the specific embodiments, it will be apparent to those skilled in the art that various changes and modifications may be made without departing from the spirit and scope of the invention as defined in the following claims.

What is claimed is:

1. A vehicle comprising:
an active air flap system comprising first, second, and third air flaps configured as a combination of a column array of air flaps and a row array of air flaps which open forward and laterally; a flap case coupled with the first, second, and third air flaps so as to match a size of a grill space in front of an engine room while defining a blast space; a sliding frame serving to laterally open the first, second, and third air flaps; a flap sliding actuator connected to the sliding frame by a pinion and a rack; and a flap rotary actuator allowing the first, second, and third air flaps to be opened forward; and
an engine control unit to control operation of the active air flap system.

2. The vehicle of claim 1, wherein the active air flap system is mounted in the grill space in front of the engine room.

3. The vehicle of claim 1, wherein the active air flap system is located in front of a cooling system provided in the engine room.

4. The vehicle of claim 1, wherein the cooling system comprises a radiator and a condenser for performing heat exchange with outside air.

5. The vehicle of claim 1, further comprising an active air flap control map connected to the engine control unit, wherein the active air flap control map controls the blast space through which external air passes, and wherein the first, second, and third air flaps are opened forward in a revolving manner and are opened laterally in a sliding manner.

6. A two-way motion type active air flap system, comprising:
a plurality of air flaps configured to be opened forward with a flap rotary actuator, and configured to be opened laterally with a flap sliding actuator;
a flap case coupled to the plurality of air flaps; and
a sliding frame coupled to the flap sliding actuator,
wherein the front opening and the lateral opening of the plurality of air flaps are controlled independently; and
wherein the plurality of air flaps includes a fixed flap fixed to the flap case, a linkage flap configured to slide with respect to the fixed flap to be stacked thereon, and a movable flap configured to slide with respect to the linkage flap to be stacked thereon and further configured to push the linkage flap such that the linkage flap is stacked on the fixed flap.

7. The two-way motion type active air flap system of claim 6, wherein the linkage flap is stacked on a back surface of the fixed flap, and the movable flap is stacked on a back surface of the linkage flap.

8. The two-way motion type active air flap system of claim 7, wherein a front stopper and a rear stopper end protrude from each end of each of the fixed flap, the linkage flap, and the movable flap in order to limit rectilinear movement of the plurality of air flaps.

9. The two-way motion type active air flap system of claim 6, wherein the plurality of air flaps consists of first, second, and third air flaps; the first, second, and third air flaps form a column array; and the fixed flap, the linkage flap, and the movable flap provided in each of the first, second, and third air flaps form a row array.

10. The two-way motion type active air flap system of claim 6, wherein the sliding frame is fixed to the movable flap of the plurality of air flaps, and is coupled to the flap sliding actuator for rectilinearly moving the movable flap such that the plurality of air flaps are opened laterally.

11. The two-way motion type active air flap system of claim 10, wherein the sliding frame is coupled to the flap sliding actuator by a rotating pinion and a rack rectilinearly moving by engaging with the pinion.

12. The two-way motion type active air flap system of claim 11, wherein the rack is provided in the sliding frame, and the pinion is rotated by the flap sliding actuator.

13. A two-way motion type active air flap system, comprising:
a plurality of air flaps configured to be opened forward with a flap rotary actuator, and configured to be opened laterally with a flap sliding actuator, wherein the front opening and the lateral opening of the plurality of air flaps are controlled independently,
wherein the plurality of air flaps are operated in response to a control signal of a controller, the plurality of air flaps are opened forward in response to a control signal changed from an active air flap ON signal to an active air flap OFF signal, and the plurality of air flaps are opened laterally in response to a lateral opening control signal output from the controller; and
wherein the lateral opening control signal is divided into a multistep type.

* * * * *